(12) United States Patent
Harik

(10) Patent No.: US 7,519,621 B2
(45) Date of Patent: Apr. 14, 2009

(54) EXTRACTING INFORMATION FROM WEB PAGES

(75) Inventor: Ralph Harik, Mountain View, CA (US)

(73) Assignee: PageBites, Inc., Mountain View, CA (US)

( * ) Notice: Subject to any disclaimer, the term of this patent is extended or adjusted under 35 U.S.C. 154(b) by 679 days.

(21) Appl. No.: 10/838,982

(22) Filed: May 4, 2004

(65) Prior Publication Data

US 2005/0251536 A1    Nov. 10, 2005

(51) Int. Cl.
   *G06F 7/00* (2006.01)
(52) U.S. Cl. .......................... 707/200; 707/3
(58) Field of Classification Search .......... 707/509, 707/517, 510, 518, 513, 519, 200, 3
   See application file for complete search history.

(56) References Cited

U.S. PATENT DOCUMENTS

| | | | |
|---|---|---|---|
| 5,826,258 A | 10/1998 | Gupta et al. | |
| 5,913,214 A | 6/1999 | Madnick et al. | |
| 6,009,410 A | 12/1999 | LeMole et al. | |
| 6,085,190 A | 7/2000 | Sakata | |
| 6,088,708 A * | 7/2000 | Burch et al. | 715/509 |
| 6,304,870 B1 | 10/2001 | Kushmerick et al. | |
| 6,516,308 B1 | 2/2003 | Cohen | |
| 6,569,208 B2 | 5/2003 | Iyer et al. | |
| 6,604,099 B1 | 8/2003 | Chung et al. | |
| 6,606,625 B1 | 8/2003 | Muslea et al. | |
| 6,631,373 B1 | 10/2003 | Otani et al. | |
| 6,675,350 B1 | 1/2004 | Abrams et al. | |
| 6,678,681 B1 | 1/2004 | Brin | |
| 6,725,425 B1 | 4/2004 | Rajan et al. | |
| 6,964,013 B1 * | 11/2005 | Ono et al. | 715/513 |
| 2001/0054049 A1 * | 12/2001 | Maeda et al. | 707/517 |
| 2002/0010709 A1 | 1/2002 | Culbert et al. | |
| 2003/0065638 A1 * | 4/2003 | Robert | 707/1 |
| 2003/0115189 A1 * | 6/2003 | Srinivasa et al. | 707/3 |
| 2004/0123237 A1 * | 6/2004 | Lin et al. | 715/513 |
| 2005/0132345 A1 * | 6/2005 | Pessolano | 717/159 |
| 2006/0047649 A1 * | 3/2006 | Liang | 707/4 |

OTHER PUBLICATIONS

Harik, R., International Search Report and the Written Opinion of the International Searching Authority for PCT/US2005/015279 filed May 3, 2005, mailed Feb. 5, 2007, 9 pages.

* cited by examiner

*Primary Examiner*—Charles Rones
*Assistant Examiner*—Fariborz Khoshnoodi
(74) *Attorney, Agent, or Firm*—Fish & Richardson P.C.

(57) ABSTRACT

Methods and apparatus, including computer program products, for identifying Web page content with a granularity finer than individual Web pages, e.g., finer than individual HTML documents. The invention provides a computer-implemented method for identifying Web page content. The method includes receiving a string of markup language source code that includes tags. The method includes identifying sub-sequences in which tags occur in the string. Each sub-sequence is associated with the portion of the string that starts with the first tag of the sub-sequence and ends with the last tag of the sub-sequence. The sub-sequences identified are ones that satisfy criteria for being classified as associated with a portion of the string that define Web page content constituting an entire listing. The criteria includes a requirement that an identified sub-sequence be repeated in tandem, either exactly or approximately, in the string. The method includes returning the identified sub-sequences.

10 Claims, 4 Drawing Sheets

FIG. 4

EXTRACTING INFORMATION FROM WEB PAGES

BACKGROUND

The present invention relates to data processing by digital computer, and more particularly to information extraction.

The field of information extraction relates to processes that extract information of interest from data stores that typically include information that is not of interest. Information extraction technology can be implemented to facilitate various applications of computing, for example, applications relating to Web pages. The term "Web" refers to the World-Wide Web, the collection of Internet sites that offer text, graphics, animation, and sound resources through the HyperText Transfer Protocol ("HTTP"). The term "Web page" refers to a block of data identified by a URL that is available on the Web. In the stereotypical case, a Web page is a HyperText Markup Language ("HTML") file stored on a server; however, the file may refer to, rather than contain, content that appears as part of the page when it is displayed by a Web browser, and it may be generated dynamically in response to a request.

Some Web pages include one or more lists. A list usually includes multiple listings, each of which is a meaningful grouping of information. Examples of Web page listings include, by way of example, information about an apartment available for rent, information describing a product for sale, a headline or summary of a news article and information describing an event.

Web pages are generally defined by source code written in a markup language, for example, HTML or Extensible Markup Language ("XML"). The source code defining a Web page is usually stored as one or more documents, which are commonly referred to as HTML documents.

SUMMARY

The present invention provides methods and apparatus, including computer program products, that implement techniques for extracting information from Web pages. The information extracted can be one or more entire listings included in the Web pages. The information extracted can have a sub-page level of granularity.

In one general aspect, the invention provides a computer-implemented method for identifying Web page content. The method includes receiving a string of HTML source code that includes tags. The method includes determining the sequence in which tags occur in the string. The method includes using the sequence to identify sub-sequences in which tags occur in the string. Each sub-sequence is associated with the portion of the string that starts with the first tag of the sub-sequence and ends with the last tag of the sub-sequence. The method includes removing from further consideration sub-sequences that do not satisfy criteria for being classified as associated with a portion of the string that define Web page content constituting an entire listing. The method includes grouping into groups sub-sequences that were not removed in the previous step. Sub-sequences that are similar, as determined by a measure based on edit distance, and do not overlap are grouped together in a group. The method includes calculating a score for each group. The score for a group is indicative of the likelihood that sub-sequences in the group are associated with portions of the string that define Web page content constituting entire listings. The score for a group is associated with each sub-sequence in the group. The method includes identifying each portion of the string that represents Web page content and is an overlap, a portion of the string being an overlap when it is associated with more than one sub-sequence. The method includes selecting, for each portion of the string identified as an overlap, sub-sequences associated with the portion of the string and removing from further consideration all the currently selected sub-sequences except the sub-sequence having a highest associated score among sub-sequences currently selected. The method includes returning the sub-sequences that were not removed from further consideration.

In general, in another aspect, the invention provides a computer-implemented method for identifying Web page content. The method includes receiving a string of markup language source code that includes tags. The method includes identifying sub-sequences in which tags occur in the string. Each sub-sequence is associated with the portion of the string that starts with the first tag of the sub-sequence and ends with the last tag of the sub-sequence. The sub-sequences identified are ones that satisfy criteria for being classified as associated with a portion of the string that define Web page content constituting an entire listing. The criteria includes a requirement that an identified sub-sequence be repeated in tandem, either exactly or approximately, in the string. The method includes returning the identified sub-sequences.

In general, in another aspect, the invention provides a computer-implemented method for generating an index for Web pages. The method includes crawling the Internet and retrieving a string of markup language source code that includes tags. The method includes identifying sub-sequences in which tags occur in the string. Each sub-sequence is associated with the portion of the string that starts with the first tag of the sub-sequence and ends with the last tag of the sub-sequence. The sub-sequences identified are ones that satisfy criteria for being classified as associated with a portion of the string that define Web page content constituting an entire listing. The criteria includes a requirement that an identified sub-sequence be repeated in tandem, either exactly or approximately, in the string. The method includes indexing the source code associated with the identified sub-sequences.

In general, in another aspect, the invention provides a computer program product, tangibly embodied in an information carrier, for identifying Web page content. The product is operable to cause data processing apparatus to receive a string of HTML source code that includes tags. The product is operable to cause data processing apparatus to determine the sequence in which tags occur in the string. The product is operable to cause data processing apparatus to use the sequence to identify sub-sequences in which tags occur in the string. Each sub-sequence is associated with the portion of the string that starts with the first tag of the sub-sequence and ends with the last tag of the sub-sequence. The product is operable to cause data processing apparatus to remove from further consideration sub-sequences that do not satisfy criteria for being classified as associated with a portion of the string that define Web page content constituting an entire listing. The product is operable to cause data processing apparatus to group into groups sub-sequences that were not removed in the previous step. Sub-sequences that are similar, as determined by a measure based on edit distance, and do not overlap are grouped together in a group. The product is operable to cause data processing apparatus to calculate a score for each group. The score for a group being indicative of the likelihood that sub-sequences in the group are associated with portions of the string that define Web page content constituting entire listings. The score for a group is associated with each sub-sequence in the group. The product is operable to cause data processing apparatus to identify each portion of the string that represents Web page content and is an overlap.

A portion of the string is an overlap when it is associated with more than one sub-sequence. The product is operable to cause data processing apparatus to select, for each portion of the string identified as an overlap, sub-sequences associated with the portion of the string and remove from further consideration all the currently selected sub-sequences except the sub-sequence having a highest associated score among sub-sequences currently selected. The product is operable to cause data processing apparatus to return the sub-sequences that were not removed from further consideration.

In general, in another aspect, the invention provides a computer program product, tangibly embodied in an information carrier, for identifying Web page content. The product includes instructions operable to cause data processing apparatus to receive a string of markup language source code that includes tags. The product includes instructions to identify sub-sequences in which tags occur in the string. Each sub-sequence is associated with the portion of the string that starts with the first tag of the sub-sequence and ends with the last tag of the sub-sequence. The sub-sequences identified are ones that satisfy criteria for being classified as associated with a portion of the string that define Web page content constituting an entire listing. The criteria includes a requirement that an identified sub-sequence be repeated in tandem, either exactly or approximately, in the string. The product includes instructions to return the identified sub-sequences.

In general, in another aspect, the invention provides a computer program product, tangibly embodied in an information carrier, generating an index for Web pages. The product includes instructions operable to cause data processing apparatus to crawl the Internet and retrieve a string of markup language source code that includes tags. The product includes instructions operable to cause data processing apparatus to identify sub-sequences in which tags occur in the string. Each sub-sequence is associated with the portion of the string that starts with the first tag of the sub-sequence and ends with the last tag of the sub-sequence. The sub-sequences identified are ones that satisfy criteria for being classified as associated with a portion of the string that define Web page content constituting an entire listing. The criteria includes a requirement that an identified sub-sequence be repeated in tandem, either exactly or approximately, in the string. The product includes instructions operable to cause data processing apparatus to index the source code associated with the identified sub-sequences.

The invention can be implemented to realize one or more of the following advantages. A system in accordance with the invention, in response to a request to search Web pages, can identify and return only Web page content that constitutes one entire listing and, in addition, satisfies the search criteria. The system can so identify and return Web page content automatically and, furthermore, without requiring input defining a listing or providing a sample of a listing, including, for example, a sample that is specific to a Web page or sample provide by a human user. A convention system, in contrast, typically either requires the described input or returns Web page content that constitutes only snippets of the Web page. The snippets may or may not constitute an entire listing.

The system can improve the relevance of search results. A search result can include only Web page content that is relevant to the search. Web page content that is not relevant to the search is omitted. A user, thus, need not parse through the irrelevant content to review the relevant content.

The system can aggregate, in a search result, information from multiple sources, e.g., different Web sites, and present the search result on a single page. Users need not access different Web sites to review the search result. One implementation of the invention provides all of the above advantages.

Details of one or more implementations of the invention are set forth in the accompanying drawings and in the description below. Further features, aspects, and advantages of the invention will become apparent from the description and the drawings.

BRIEF DESCRIPTION OF THE DRAWINGS

FIG. 4 shows a search result that includes Web page content constituting entire Web page listings and satisfying the search criteria.

Like reference numbers and designations in the various drawings indicate like elements.

DETAILED DESCRIPTION

The source code defining a Web page typically include tags that structure the content of the Web page. The tags can also provide other functions, for example, functions that place text in bold or italicized form.

The tags in the source code usually occur in a particular sequence. If, for example, the Web page consists of a title, a heading, and two paragraphs of text, the tags would be of the sequence: (<html>, <head>, <title>, </title>, </head>, <body>, <h1>, </h1>, <p>, </p>, <p>, </p>, </body>, </html>).

The sequence of tags in the source code has one or more sub-sequences, which are generally contiguous portions of the sequence. The sub-sequences can and usually have different lengths, which is the number of tags included in a sub-sequence. The above listed sequence has, for example, the sub-sequence (<title>) and the sub-sequence (<title>, </title>). As can be seen, a sub-sequence can have a length of one tag. The sub-sequences can start at different positions in the sequence. The above listed sequence has, for example, the sub-sequence (</h1>, <p>), which starts at the eighth position in the sequence, and the sub-sequence (<p>, </p>, <p>, </p>), which starts at the ninth position in the sequence. Sub-sequences can overlap with each other, i.e., share common tags. The above listed sequence has, for example, the sub-sequence (<title>, </title>, </head>, <body>, <h1>), and also the sub-sequence (</title>, </head>, <body>, <h1>, </h1>, <p>, </p>). The common tags here are </title>, </head>, <body>, and <h1>. Sequence and sub-sequences are denoted in the instant application by enclosing their elements in parentheticals.

Each sub-sequence of tags is associated with the particular portion of source code that starts and ends with the first tag and the last tag, respectively, of the sub-sequence. The particular portion of source code can define corresponding content of the Web page. The tag in a sub-sequence that includes only one tag is both the first and the last tag.

Web page content constituting entire listings can be identified and extracted from a Web page by identifying sub-sequences of tags that are repeated in the source code that define the Web page. Sub-sequences of tags that repeat exactly or approximately can be identified. A sub-sequence of tags is repeated exactly when the exact sub-sequence reoccurs in subsequent source code. A sub-sequence of tags is approximately repeated when a similar sub-sequence occurs in subsequent source code. The measure of similarity can be based on edit distance, as will be described below. Sub-sequences of tags can be repeated in tandem. In one implementation, sub-sequences of tags that are approximately repeated in tandem are identified to identify and extract, from a Web page, content constituting entire listings.

Figure 1:
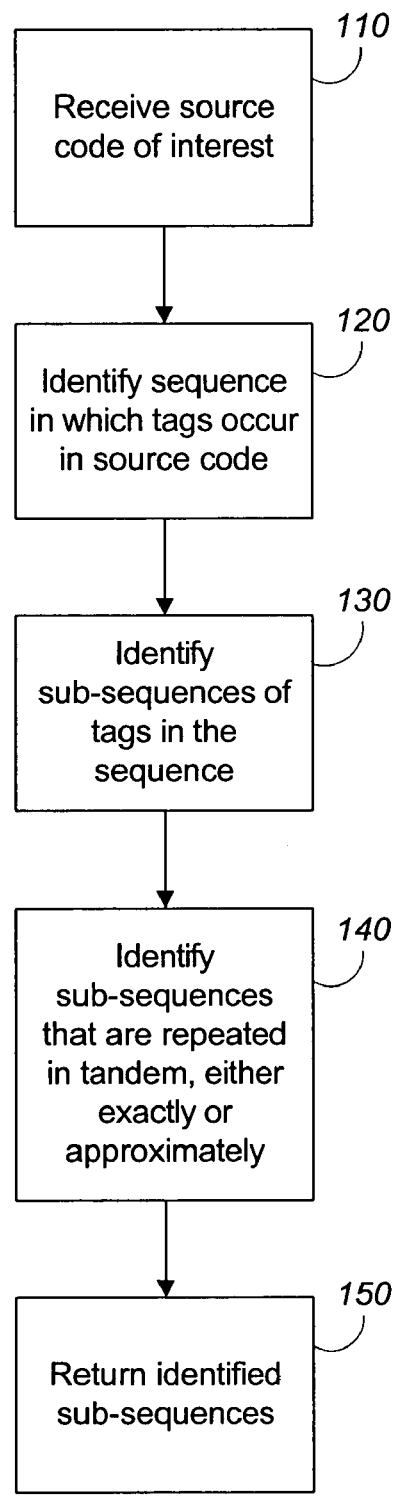
FIG. 1 is a flowchart illustrating an information extraction method.

FIG. 1 shows a method for identifying Web page content that constitutes entire listings. The method includes receiving source code of interest (step 110). The source code is written in a markup language. The source code can be HTML source code that was retrieved by a Web crawler.

The method includes identifying the sequence in which tags occur in the source code (step 120). The sequence in which tags occur in the source code will be referred to as the sequence of tags.

The method includes identifying sub-sequences of tags in the sequence of tags (step 130). Identification of sub-sequences can be implemented by selecting a tag in the sequence and then identifying sub-sequences that start with the selected tag. Once all sub-sequences that start with the selected tag have been identified, another tag of the sequence can be selected. In one implementation, tags are selected in the order indicated by the sequence of tags. A length limit, for example, 100 tags, can be implemented so that the identification of sub-sequences starting with the currently selected tags is stopped when the limit is reached. A tag that has not been selected is then selected and sub-sequences starting with the currently selected tag are identified.

The method includes identifying sub-sequences of tags that are repeated in tandem, either exactly or approximately (step 140). Sub-sequences of tags that are repeated in tandem are likely to define Web page content that constitutes entire listings.

The method includes returning the identified sub-sequences (step 150). The identified sub-sequences can be returned, for example, to a process that indexes HTML source code retrieved by the Web crawler. The index generated can thus store Web page content at a sub-page level of granularity.

Figure 2:
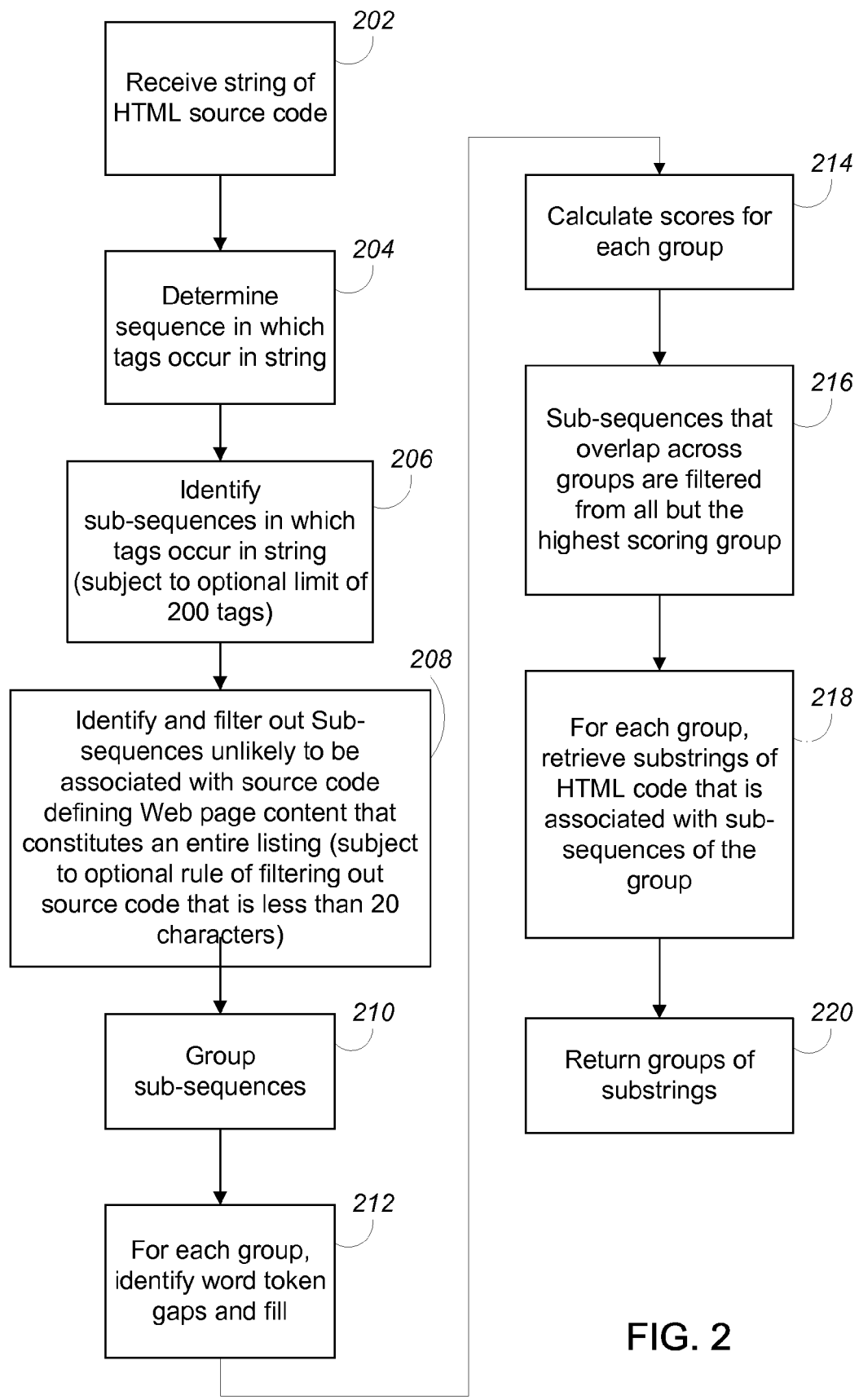
FIG. 2 is a flowchart illustrating an implementation of the information extraction method.

FIG. 2 shows an implementation of the information extraction method. The input to this method is a string of HTML source code. The output of the method is one or more groups, each of which include substrings of the input string. Substrings in a group are similar to each other and do not overlap (i.e., share common HTML source code). Furthermore, substrings in a group do not overlap with substrings of other groups.

A string of HTML source code is received (step 202). The string of HTML source code defines a Web page. Alternatively, the HTML source code can define multiple Web pages.

The sequence in which tags occur in the string of HTML source code is determined (step 204). The string of HTML source code is tokenized by a lexical analyzer that generates three types of tokens: tag tokens, text tokens, and comment tokens. A tag token generally represents HTML source code starting with an open angle bracket "<" and ending with a close angle bracket ">", except for source code that matches the comment token rule described below. A word token represents HTML source code that is found between tags. In general, this source code is the Web page content displayed by a browser. The content can include text as well as images. A comment token generally represents HTML source code starting with "<!--" and ending with "-->". The tokenization process produces an array of tokens. The order in which the tokens occur in the array is the order in which the HTML source code that the tokens represent occurs in the string of HTML source code. In this specification, the above described array of tokens will be referred to as the all-token array. Arrays are denoted below by enclosing their elements in square brackets.

A tag-token array that contains only tag tokens from the all-token array is generated. Optionally, tags that do not necessarily structure information of a Web page, e.g., the <input> tag and the <option> tag, are not included in the tag token array. The sequence of tag tokens in the all-token array is preserved in the tag token array. The sequence of tag tokens in the tag-token array thus indicates the sequence in which the tags occur in the string of HTML source code.

Sub-sequences of tag tokens in the tag token array correspond directly to sub-sequences of tags in the HTML source code. Thus, a sub-sequence of tag tokens in the tag token array, like its corresponding sub-sequence of tags, is associated with the particular portion of the string of HTML source code that starts with the first tag and ends with the last tag of the sub-sequence of tags.

The sub-sequences in which tags occur in the HTML source code are identified (step 206). Sub-sequences of tags are identified by identifying the corresponding sub-sequences of tag tokens in the tag token array, which is accomplished as follows.

Each tag token in the tag token array is selected. The order in which the tag tokens are selected is the order in which they appear in the array. For the tag currently selected, sub-sequences of tag tokens that start with the selected tag token are identified. A length limit of 200 tag tokens is implemented so that searches for sub-sequences of tag tokens that start with the currently selected tag token are limited. Alternatively, a different limit or no limit can be implemented. The next tag token is selected and sub-sequences of tag tokens that start with the next tag token are identified. By way of example, given the tag token array [TT_1, TT_2, TT_3, TT_4], the following 10 sub-sequences of tag tokens are identified: (TT_1), (TT_1, TT_2), (TT_1, TT_2, TT_3), (TT_1, TT_2, TT_3, TT_4), (TT_2), (TT_2, TT_3), (TT_2, TT_3, TT_4), (TT_3), (TT_3, TT_4), and (TT_4). In this specification, "TT" denotes tag token. Word tokens are denoted by "WT". The number indicated with each element of an array, i.e., TT or WT, represents the sequential position of the element with respect to its type. Given, for example, the array [TT_1, TT_2, WT_1, TT_3, TT_3] is the third tag token listed in the array and WT_1 is the first listed word token in the array. The above described sequential position is referred to in this specification as the array index of the array element.

Sub-sequences of tags unlikely to be associated with source code defining Web page content that constitutes an entire listing are identified and filtered out (step 208). Filtering out a sub-sequence includes removing it from further consideration in subsequent steps of the information extraction method. Sub-sequences of tags are identified and filtered out by identifying and filtering out the corresponding sub-sequences of tag tokens.

Filtering can be effected by filter rules that are applied to the sub-sequences of tag tokens identified in the previous step. Application of the filter rules usually requires a comparison of tag tokens. In the present implementation, tag tokens are compared strictly based on the tag name and whether the tags are open or close tags; attributes of the tag are ignored. Therefore, the tag <a href="www.xyz.com"> is equivalent to the tag <a href="www.abc.com">. Alternatively, tag tokens can be compared based on one or more attributes of the tags. The following seven rules are examples of filter rules. Alternatively, different, fewer, or additional rules can be implemented.

Rule 1. Sub-sequences of tag tokens that are of a specific length are filtered out. The length of a sub-sequence of tag token is defined by the total number of tag tokens included in the sub-sequence. Sub-sequences having a length of 1 are filtered out, as are sub-sequences having a length of greater than 200.

Rule 2. For every end tag token of type x in a sub-sequence of tag tokens, the sub-sequence must include a start tag token of type x, and the start tag token of type x must precede the end tag token of type x; otherwise the sub-sequence will be filtered out. For example, the sub-sequence (</tr>, <tr>, <td>, </td>, </tr>) is filtered out because the sub-sequence contains an end tag token </tr> at index 1 but does not contain a preceding start tag token <tr>.

Rule 3. For every start tag token of type x in a sub-sequence of tag tokens, the sub-sequence must contain an end tag token of type x, and the end tag token must succeed the start tag token, otherwise the sub-sequence will be filtered. For example, the sub-sequence (<tr>, <td>, </td>, <td>, </td>) is filtered out because the sub-sequence contains a start tag token <tr> at array index 1 but does not contain a succeeding end tag token </tr>. This filter rule does not apply to start tag tokens that do not require an end tag token. For example the start tag token <br> does not require an end tag token, therefore the sub-sequence (<br>, <font>, </font>) is not filtered out.

Rule 4. If the total number of characters in the one or more word tokens that a sub-sequence of tag tokens encloses is fewer than 20 characters, then the sub-sequence will be filtered out. As discussed above, tags can delimit HTML source code that defines Web page content. Thus, the tag tokens that represent the tags can enclose the word token that represents the HTML source code defining the Web page content. Given a sub-sequence of tag tokens, the all-token array can be used to determine which word tokens, if any, are included in the given sub-sequence of tag tokens.

Rule 5. If a first sub-sequence of tag tokens includes a second sub-sequence that is exactly repeated in tandem at least once, then the first sub-sequence is filtered out. For example, the sub-sequence (<tr>, <td>, </td>, </tr>, <tr>, <td>, </td>, </tr>) is filtered because it includes the sub-sequence (<tr>, <td>, </td>, </tr>), which is exactly repeated. Note that the second sub-sequence can be partially repeated. For example, the sub-sequence (<br>, <br>, <font>, </font>) is repeated 2.5 times in the sub-sequence (<br>, <br>, <font>, </font>, <br>, <br>, <font>, </font>, <br>, <br>). The instant rule would filter out the sub-sequence (<br>, <br>, <font>, </font>, <br>, <br>, <font>, </font>, <br>, <br>).

Rule 6. If a first sub-sequence of tag tokens includes a second sub-sequence that is approximately repeated only once in tandem within the first sub-sequence, then the first sub-sequence is filtered out. The first sub-sequence is referred to in the present specification as a sub-sequence that has an approximate tandem repeat. The sub-sequence (<b>, </b>, <font>, </font>, <b>, </b>, <br>, <font>, </font>) is filtered out because it contains the approximate tandem of (<b>, </b>, <font>, </font>) and (<b>, </b>, <br>, <font>, </font>).

To determine if a sub-sequence of tag tokens is one that has an approximate tandem repeat, the sub-sequence in question is divided at each position of the sub-sequence. Each division results in two sub-sequences, a first sub-sequence that includes tag tokens that precede the index and a second sub-sequence that includes the tag token at the position and tag tokens that succeed the position. A similarity score, the calculation of which will be described below, is calculated between the sub-sequences resulting from a division. If a particular division generates a similarity score that is above a threshold, then the sub-sequence is deemed to be an approximate single tandem. Only sub-sequences resulting from divisions that yield a valid first sub-sequence are considered. Validity is determined by the filter Rules 1-4 described above. For example, given the sub-sequence (<b>, </b>, <font>, </font>, <b>, </b>, <br>, <font>, </font>), the sub-sequences resulting from the division at the fourth position, i.e., (<b>, </b>, <font>) and (</font>, <b>, </b>, <br>, <font>, </font>) are not considered because (<b>, </b>, <font>) violates filter Rule 3. However, the sub-sequences (<b>, </b>, <font>, </font>) and (<b>, </b>, <br>, <font>, </font>) are considered, as this sub-sequence does not violate filter Rules 1-4.

Rule 7. It is possible for different sub-sequences of tag tokens to enclose the same word token. For example, given the all-tokens array [TT__1, TT__2, WT__1, TT__3], the sub-sequence (TT__1, TT__2, TT__3) and the sub-sequence (TT__2, TT__3) both enclose the word token WT__1. If more than one sub-sequence encloses the exact same set of word tokens, then all but one of these sub-sequences will be filtered out. The sub-sequence with the greatest length is kept and the other are removed. In the example above, the sub-sequence (TT__1, TT__2, TT__3) would be kept and the sub-sequence (TT__2, TT__3) would be filtered out.

The sub-sequences of tags identified in step 206 and not filtered out in step 208 are grouped (step 210 of FIG. 2). Grouping sub-sequences of tags is accomplished by grouping the corresponding sub-sequences of tag tokens. Generally, sub-sequences of tag tokens that do not overlap and are similar are grouped together. Overlap and similarity are defined below.

Two sub-sequences of tag tokens are similar if the similarity score of the two sub-sequences is greater than a threshold, e.g., a threshold of 0.8. Alternatively, higher or lower thresholds can be set as appropriate. The similarity score of two sub-sequences is calculated using the formula [1−(Levenshtein distance/length of larger sequence)]. Levenshtein distance, also known as edit distance, is generally defined as the smallest number of insertions, deletions, and substitutions required to change one string into another. In the present implementation, Levenshtein distance is the smallest number of insertions, deletions, and substitutions to change one sub-sequence into another. As discussed above, tag token comparisons are strictly based on the tag name and whether the tags are open or closed tags; attributes of the tag are ignored.

A first sub-sequence tag tokens and a second sub-sequence of tag tokens are said to overlap if the intersection of the set of word tokens included in the first sub-sequence and the set of word tokens included in the second sub-sequence is not the empty set. That is, the first and second sub-sequences overlap if they include the same word token.

The grouping of step 210 can be accomplished in two stages. In the first stage, groups are defined by selecting each of the sub-sequences of tag tokens being grouped. The collection of sub-sequences of tag tokens being grouped will be referred to as the set of sub-sequences being grouped. The selected sub-sequence is compared to sub-sequences of currently defined groups. If the selected sub-sequence is similar to at least 80% of the sub-sequences currently in the group and do not overlap with the sub-sequences in a currently defined group, as similarity and overlap are defined above, then the sub-sequence is assigned to that group. If the selected sub-sequence is not assigned to any of the currently defined group, then a new group having only the selected sub-sequence is defined. For the first selected sub-sequence, there is no group that is currently defined. So, a group having only the first selected sub-sequence as an element is defined. A sub-sequence can be added to more than one group.

In the second stage, no new group is defined. Each of the set of sub-sequences being grouped is selected and considered for membership in each of the groups defined in the first stage. The requirements for membership is similar to those for the first stage. Selection continues until one complete iteration results in no change in group membership, where an iteration is complete when each of the sub-sequence in the set of sub-sequences being grouped has been selected once. Multiple iterations may be needed before an iteration results in no change in membership.

Word token gaps, if any exist, are identified for each group and sub-sequences that fill the identified gaps are added to the group (step 212). A group consists of a collection of sub-sequences, each of which encloses a set of word tokens. Furthermore, the sub-sequences in each of the groups can be sorted by token index. Given a group of sub-sequences, it is thus possible to list in sequential order the word tokens that the group encloses. As an example, consider a group that contains two sub-sequences. Let the first sub-sequence enclose the fourth word token in the all token array and the second sub-sequence enclose the sixth word token in the all tokens array. The word tokens that the group encloses in sequential order are ones that represent the fourth and sixth word tokens of the all token array. The group being considered contains a word token gap because the fifth word token is missing.

Once all the word token gaps of a particular group are identified, they are filled with one or more sub-sequences that enclose the missing word tokens. The sub-sequence or sub-sequences that fill a gap must not overlap with any of the other sub-sequences in the group, and they must be similar (i.e., have a similarity score of 0.8 or greater) to at least 50% of the other sub-sequences currently in the group. If a sub-sequence fills the gap and meets the non-overlapping and similarity requirements, then the sub-sequence is added to the group. Alternatively, different similarity requirements can be implemented. For example, similarity scores other than 0.8 and/or percentages other than 50% can be implemented.

A score for each of the groups is calculated (step 214). A group's score is calculated using the following formula (1000−(Total Group Edit Distance/Number of Sub-sequences))*Total Number of Tandems*Longest Consecutive Tandem), where:

Total Group Edit Distance is the running total edit distances between all sub-sequence pairs in the group. For example, given a group of 3 sub-sequences, the total group edit distance would be $ED(1,2)+ED(1,3)+ED(2,3)$, where $ED(x,y)$ is the edit distance between sequence x and sequence y;

Number of Sub-sequences is the total number of sub-sequences that are in the group;

Total Number of Tandems is the total number of sub-sequence pairs in the group that are in tandem; and Longest Consecutive Tandem is the length of the longest consecutive tandem in the group. Consider a group of sub-sequences $S\_1, S\_2, S\_3, S\_4$, and $S\_5$, where the number indicated represents order in which the sub-sequence occurs in the HTML string. If $S\_1, S\_2$ are tandem, and $S\_2, S\_3$ are tandem then $S\_1, S\_2, S\_3$ is a consecutive tandem of size 2 (as there are 2 pairs in a row that are tandem).

Alternatively, other formulas can be used to calculate scores for the groups, so long as the scores are indicative of the likelihood that sub-sequences in the group are associated with portions of the string that define Web page content constituting entire listings. The alternative formulas can include the factors included in the above formula or some subset of them.

Sub-sequences of tags that overlap across groups are filtered from all but the highest scoring group (step 216). Cross group overlap occurs when sub-sequences from different groups overlap. Sub-sequences of tags that overlap across groups are identified by identifying the corresponding sub-sequences of tag tokens.

Sub-sequences of tag tokens that overlap across groups are identified by selecting each sub-sequence in a group and comparing the selected sub-sequence against sub-sequences of other groups for overlapping word tokens. Once the sub-sequences that overlap with the selected sub-sequences are found, the overlapping sub-sequences are filtered out from all but the group having the highest score. The above described process continues until all sub-sequences of all groups have been processed.

For each group, retrieve the substrings of HTML code that is associated with the sub-sequences of the group (step 218). To retrieve the source code of a sub-sequence, the two tags that are represented by the first and last tag token of the sub-sequence are identified. The substring that starts and ends with the identified tags is the substring that is associated with the sub-sequence.

Return groups of substrings (step 220). Optionally, each substring can be associated with the score of its group. The score can then be returned with the substring. The substrings can be returned to various processes, one of which is a process that generates an index of Web pages for a search engine.

Figure 3:
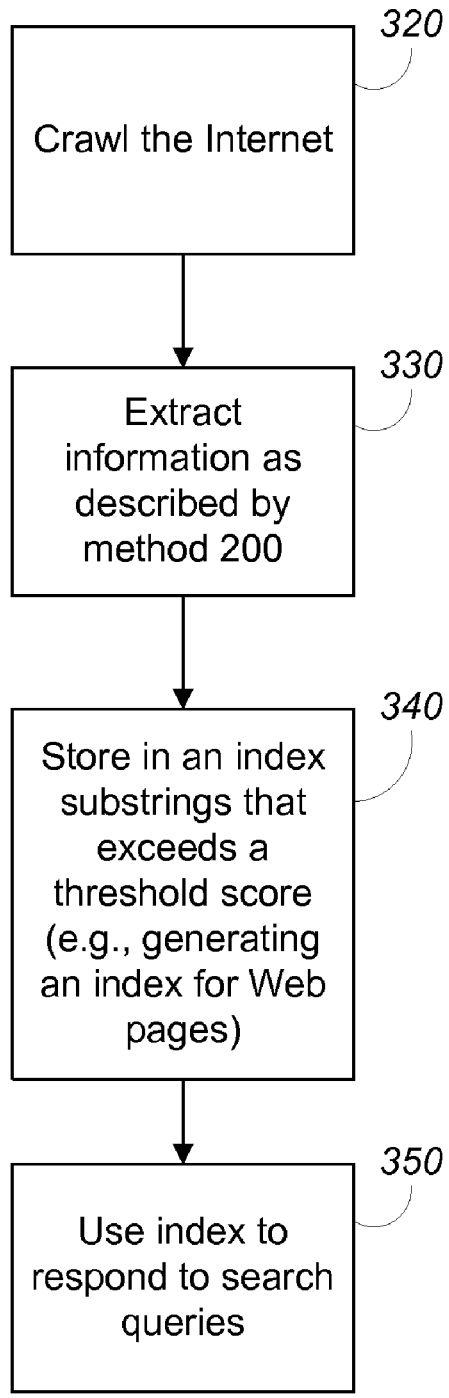
FIG. 3 is a flowchart illustrating a process for generating a Web page index that has a sub-page level of granularity.
Figure 4:
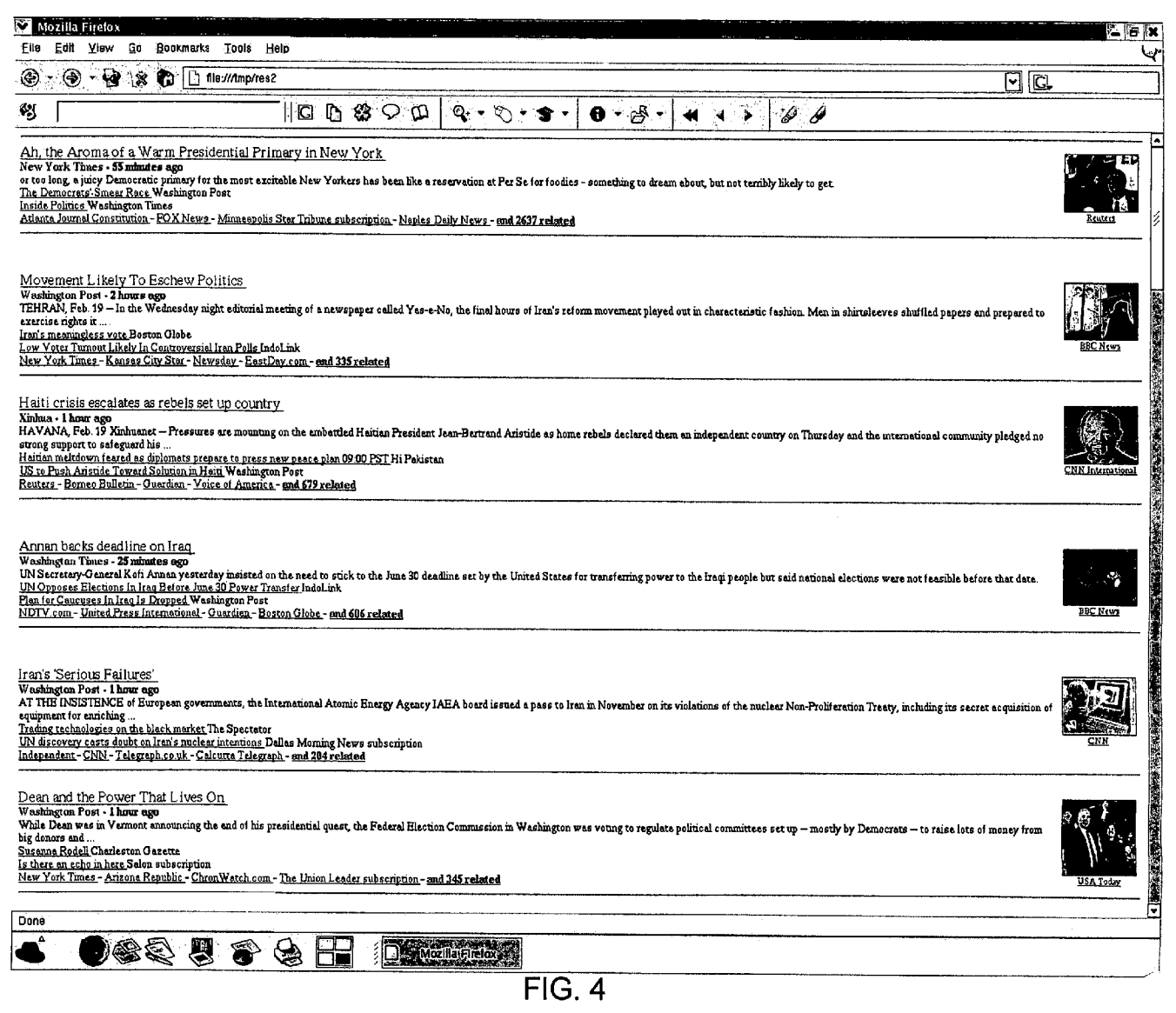

FIG. 3 is a flowchart illustrating a process for generating a Web page index that has a sub-page level of granularity. The method includes the following actions. Crawl the Internet, an intranet, or some part of one or more of them (step 320). A conventional Web crawler can be used. The HTML source code retrieved can be stored in a database. Apply the above described information extraction method 200 to the HTML source code retrieved (step 330). The result of the method 200 is one or more groups of substrings of HTML source code. Index and store in a database index substrings of groups having a score that exceeds a threshold (step 340). In response to a search request, use the index to provide a response having a sub-page level of granularity (step 350). The response can include Web page content that constitute entire Web page listings that satisfy the search criteria. FIG. 4 shows an example of such a response.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in e.g., in a machine-readable storage device or for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. The features described above can be applied to any markup languages, including the Extensible Markup Language. The above described information extraction techniques can have various applications. Implementations of information extraction processes can, for example, extract stock quotes from Web pages, facilitates comparison shopping on the Internet, extract job listings from a network, and remove advertisements from Web pages. The processing described above can be applied to source code that is received by a browser, for example, source code dynamically generated by a script being executed by a client. Thus, the features described in this specification can be implemented for not only source code that is stored on a server but also source code that is received by a browser. The above described filtering process can be implemented by using criteria for classifying sub-sequences as being associated with Web page content that constitutes entire listings. Criteria for classifying sub-sequences as not being associated with Web page content that constitutes entire listings can also be implemented. The criteria can include rules similar to those discussed above.

Other embodiments are within the scope of the instant application and following claims.

The invention claimed is:

1. A computer-implemented method for identifying webpage content, the method comprising: receiving from a memory storage device a string of HTML source code that includes tags;
   determining the sequence in which tags occur in the string;
   using the sequence to identify one or more sub-sequences in which tags occur in the string, each sub-sequence being associated with a portion of the string that starts with the first tag of the sub-sequence and ends with the last tag of the sub-sequence;
   determining whether the identified sub-sequences define webpage content constituting an entire webpage listing, the determining including;
   applying a first set of criteria to filter the identified sub-sequences, the first set of criteria including a requirement that an identified sub-sequence be repeated in tandem, either exactly or approximately, in the string;
   removing from further consideration sub-sequences that do not satisfy the first set of criteria;
   grouping the remaining sub-sequences into groups, wherein sub-sequences are grouped together in a group when they do not overlap and are similar, as determined by a measure based on edit distance;
   calculating a score for each group, the score for a group being associated with each sub-sequence in the group, the score being indicative of the likelihood that sub-sequences in the group define webpage content constituting entire webpage listings;
   identifying overlapping sub-sequences between different groups, wherein identifying includes selecting each sub-sequence in a group and comparing the selected sub-sequence against sub-sequences of other groups for one or more overlapping word tokens;
   removing from further consideration all identified overlapping sub-sequences between different groups except sub-sequences from the group having a highest associated score among sub-sequences currently selected; and
   returning and storing in the memory storage device the sub-sequences that were not removed from further consideration.

2. The method of claim 1, wherein grouping the remaining sub-sequences into groups includes:
   for each group, identifying any portion of the string that is delimited by and does not include source code associated with the sub-sequences of the group, and identifying and adding to the group one or more sub-sequences still under consideration and associated with the identified portion of string.

3. The method of claim 2, wherein determining the sequence in which tags occur in the string includes:
   generating a tokenized version of the string, the tokenized version including tag tokens, each tag token representing a corresponding tag in the string, the sequence and sub-sequences of tag tokens in the tokenized version being the same as the sequence and sub-sequences of tags in the string; and using the tokenized version to identify the sequence and sub-sequences in which tags occur in the string.

4. The method of claim 3, wherein: the tokenized version includes one or more word token that represent source code defining webpage content; and identifying a portion of the string that is delimited by source code associated with the sub-sequences of a group includes identifying a word token that represents the portion of the string.

5. The method of claim 1, wherein removing from consideration sub-sequences that do not satisfy the first set of criteria includes removing sub-sequences that include any combination of:

a close tag of a first type without including a succeeding close tag of the first type;

an open tag of the first type without including a succeeding close tag of the first type;

only one tag or more than 200 tags;

another sub-sequence that is approximately repeated only once in tandem within the sub-sequence being considered;

another sub-sequence that is exactly repeated in tandem at least once within the sub-sequence being considered; and a portion of source code that represents webpage content and, furthermore, is less than 20 characters.

6. A computer program product, tangibly embodied in a machine-readable storage device, for identifying webpage content, the computer program product including instructions to cause data processing apparatus to:

receive a string of HTML source code that includes tags;

determine the sequence in which the tags occur in the string;

use the sequence to identify one or more sub-sequences in which the tags occur in the string, each sub-sequence being associated with a portion of the string that starts with the first tag of the sub-sequence and ends with the last tag of the sub-sequence;

determine whether the identified sub-sequences define webpage content constituting an entire webpage listing, the determining including;

applying a first set of criteria to filter the identified sub-sequences, the first set of criteria including a requirement that an identified sub-sequence be repeated in tandem, either exactly or approximately, in the string;

remove removing from further consideration sub-sequences that do not satisfy the first set of criteria;

grouping the remaining sub-sequences into groups, wherein sub-sequences are grouped together in a group when they do not overlap and are similar, as determined by a measure based on edit distance;

calculating a score for each group, the score for a group being associated with each sub-sequence in the group, the score being indicative of the likelihood that sub-sequences in the group define webpage content constituting entire webpage listings;

identifying overlapping sub-sequences between different groups, wherein identifying includes selecting each sub-sequence in a group and comparing the selected sub-sequence against sub-sequences of other groups for one or more overlapping word tokens;

removing from further consideration all identified overlapping sub-sequences between different groups except sub-sequences from the group having a highest associated score among sub-sequences currently selected; and returning and storing the sub-sequences that were not removed from further consideration.

7. The product of claim 6, wherein the instructions to group the remaining subsequences into groups includes instructions to:

for each group, identify any portion of the string that is delimited by and does not include source code associated with the sub-sequences of the group, and identify and add to the group one or more sub-sequences still under consideration and associated with the identified portion of string.

8. The product of claim 7, wherein the instructions to determine the sequence in which tags occur in the string includes instructions to:

generate a tokenized version of the string, the tokenized version including tag tokens, each of which representing a corresponding tag in the string, the sequence and sub-sequences of tag tokens in the tokenized version being the same as the sequence and sub-sequences of tags in the string; and use the tokenized version to identify the sequence and sub-sequences in which tags occur in the string.

9. The product of claim 8, wherein: the tokenized version includes one or more word token that represent source code defining webpage content; and identifying a portion of the string that is delimited by source code associated with the sub-sequences of a group includes identifying a word token that represents the portion of the string.

10. The product of claim 6, wherein removing from consideration sub-sequences that do not satify the first set of criteria includes removing sub-sequences that include any combination of:

a close tag of a first type without including a preceding open tag of the first type;

an open tag of the first type without including a succeeding close tag of the first type;

only one tag or more than 200 tags;

another sub-sequence that is approximately repeated only once in tandem within the sub-sequence being considered; another sub-sequence that is exactly repeated in tandem at least once within the sub-sequence being considered; and a portion of source code that represents webpage content and, furthermore, is less than 20 characters.

* * * * *

UNITED STATES PATENT AND TRADEMARK OFFICE
CERTIFICATE OF CORRECTION

| | |
|---|---|
| PATENT NO. | : 7,519,621 B2 |
| APPLICATION NO. | : 10/838982 |
| DATED | : April 14, 2009 |
| INVENTOR(S) | : Ralph Harik |

It is certified that error appears in the above-identified patent and that said Letters Patent is hereby corrected as shown below:

Column 12, lines 14-54, please delete Claim 1 in its entirety and insert

--1. A computer-implemented method for identifying webpage content, the method comprising:
   receiving from a memory storage device a string of HTML source code that includes tags;
   determining the sequence in which the tags occur in the string;
   using the sequence to identify one or more sub-sequences in which the tags occur in the string, each sub-sequence being associated with a portion of the string that starts with the first tag of the sub-sequence and ends with the last tag of the sub-sequence;
   determining whether the identified sub-sequences define webpage content constituting an entire webpage listing, the determining including:
      applying a first set of criteria to filter the identified sub-sequences, the first set of criteria including a requirement that an identified sub-sequence be repeated in tandem, either exactly or approximately, in the string;
      removing from further consideration sub-sequences that do not satisfy the first set of criteria;
      grouping the remaining sub-sequences into groups, wherein sub-sequences are grouped together in a group when the sub-sequences do not overlap and are similar, as determined by a measure based on edit distance;
      calculating a score for each group, the score for a group being associated with each sub-sequence in the group, the score being indicative of the likelihood that sub-sequences in the group define webpage content constituting entire webpage listings;
      identifying overlapping sub-sequences between different groups, wherein identifying includes selecting each sub-sequence in a group and comparing the selected sub-sequence against sub-sequences of other groups for one or more overlapping word tokens;
      removing from further consideration all identified overlapping sub-sequences between different groups except sub-sequences from the group having a highest associated score among sub-sequences currently selected; and
   returning and storing in the memory storage device the sub-sequences that were not removed from further consideration.-- therefor;

Column 13, line 7 (Claim 4), please delete "token that represent" and insert --tokens representing-- therefor;

Column 13, lines 16-17 (Claim 5), please delete "succeeding close" and insert --preceding open-- therefor;

UNITED STATES PATENT AND TRADEMARK OFFICE
CERTIFICATE OF CORRECTION

PATENT NO. : 7,519,621 B2
APPLICATION NO. : 10/838982
DATED : April 14, 2009
INVENTOR(S) : Ralph Harik It is certified that error appears in the above-identified patent and that said Letters Patent is hereby corrected as shown below:

Column 13, line 29 through Column 14, line 13, please delete Claim 6 in its entirety and insert --6. A computer program product, tangibly embodied in a machine-readable storage device, for identifying webpage content, the computer program product including instructions to cause data processing apparatus to:
    receive a string of HTML source code that includes tags;
    determine the sequence in which the tags occur in the string;
    use the sequence to identify one or more sub-sequences in which the tags occur in the string, each sub-sequence being associated with a portion of the string that starts with the first tag of the sub-sequence and ends with the last tag of the sub-sequence;
    determine whether the identified sub-sequences define webpage content constituting an entire webpage listing, the determining including:
    applying a first set of criteria to filter the identified sub-sequences, the first set of criteria including a requirement that an identified sub-sequence be repeated in tandem, either exactly or approximately, in the string;
    removing from further consideration sub-sequences that do not satisfy the first set of criteria;
    grouping the remaining sub-sequences into groups, wherein sub-sequences are grouped together in a group when the sub-sequences do not overlap and are similar, as determined by a measure based on edit distance;
    calculating a score for each group, the score for a group being associated with each sub-sequence in the group, the score being indicative of the likelihood that sub-sequences in the group define webpage content constituting entire webpage listings;
    identifying overlapping sub-sequences between different groups, wherein identifying includes selecting each sub-sequence in a group and comparing the selected sub-sequence against sub-sequences of other groups for one or more overlapping word tokens;
    removing from further consideration all identified overlapping sub-sequences between different groups except sub-sequences from the group having a highest associated score among sub-sequences currently selected; and
    returning and storing the sub-sequences that were not removed from further consideration.-- therefor;

Column 14, line 27 (Claim 8), please delete "of which" and insert --tag token-- therefor;

Column 14, line 35 (Claim 9), please delete "token that represent" and insert --tokens representing-- therefor;

UNITED STATES PATENT AND TRADEMARK OFFICE
CERTIFICATE OF CORRECTION

PATENT NO. : 7,519,621 B2
APPLICATION NO. : 10/838982
DATED : April 14, 2009
INVENTOR(S) : Ralph Harik It is certified that error appears in the above-identified patent and that said Letters Patent is hereby corrected as shown below:

Column 14, line 41 (Claim 10), please delete "satify" and insert --satisfy-- therefor.

Signed and Sealed this

Fifteenth Day of September, 2009

David J. Kappos
*Director of the United States Patent and Trademark Office*